United States Patent
Augsburg et al.

(10) Patent No.: US 6,826,747 B1
(45) Date of Patent: Nov. 30, 2004

(54) SYSTEM AND METHOD FOR TRACING PROGRAM INSTRUCTIONS BEFORE AND AFTER A TRACE TRIGGERING EVENT WITHIN A PROCESSOR

(75) Inventors: Victor Roberts Augsburg, Apex, NC (US); Jeffrey Todd Bridges, Raleigh, NC (US); Thomas K. Collopy, Cary, NC (US); James N. Dieffenderfer, Apex, NC (US); Thomas Andrew Sartorius, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 09/412,124

(22) Filed: Oct. 5, 1999

Related U.S. Application Data (63) Continuation of application No. 08/760,553, filed on Dec. 5, 1996, now Pat. No. 5,996,092.

(51) Int. Cl.[7] .............................................. G06F 11/30
(52) U.S. Cl. ........................ 717/128; 712/227; 714/39; 714/45; 717/129
(58) Field of Search ................... 714/39, 45; 712/227; 717/128, 129

(56) References Cited

U.S. PATENT DOCUMENTS

| | | | | |
|---|---|---|---|---|
| 5,146,586 A | * | 9/1992 | Nakano | 714/2 |
| 5,642,479 A | * | 6/1997 | Flynn | 714/45 |
| 5,675,729 A | * | 10/1997 | Mehring | 714/37 |
| 5,724,505 A | * | 3/1998 | Argade et al. | 714/45 |
| 5,809,293 A | * | 9/1998 | Bridges et al. | 712/227 |
| 5,848,264 A | * | 12/1998 | Baird et al. | 703/28 |
| 5,964,893 A | * | 10/1999 | Circello et al. | 714/39 |

* cited by examiner

Primary Examiner—Kenneth S. Kim
(74) Attorney, Agent, or Firm—Kelly K. Kordzik; Winstead Sechrest & Minick P.C.

(57) ABSTRACT

A system and method for tracing program code within a processor having an embedded cache memory. The non-invasive tracing technique minimizes the need for trace information to be broadcast externally. The tracing technique monitors changes in instruction flow from the normal execution stream of the code. The tracing technique monitors the updating of processor branch target register contents in order to monitor branch target flow of the code. Tracing of the program flow includes tracing instructions both before and after a trace triggering event. The implementation of periodic synchronizing events enables the tracing of instructions occurring before and after a triggering event, and then providing the trace information externally from the processor.

19 Claims, 8 Drawing Sheets

SYSTEM AND METHOD FOR TRACING PROGRAM INSTRUCTIONS BEFORE AND AFTER A TRACE TRIGGERING EVENT WITHIN A PROCESSOR

CROSS-REFERENCE TO RELATED PATENT APPLICATION

This is a continuation of application Ser. No. 08/760,553 filed Dec. 5, 1996, now issued U.S. Pat. No. 5,996,092.

This application for patent is related to U.S. patent application Ser. No. 08/283,128 entitled "A SYSTEM AND METHOD FOR PROGRAM EXECUTION TRACING WITHIN AN INTEGRATED PROCESSOR", now issued U.S. Pat. No. 5,809,293, which is hereby incorporated by reference herein.

TECHNICAL FIELD

The present invention relates in general to data processing systems, and in particular, to program execution tracing within an integrated processor.

BACKGROUND INFORMATION

The present invention addresses the need to acquire a real-time trace of program execution from a highly integrated microprocessor. Typically, users wish to obtain a "trace" or listing, of exactly what instructions execute during each clock cycle for a limited period of time during the execution of a program in order to debug or analyze the performance of the program. A "real-time" trace is one that can be acquired while the program runs at normal speed, in the actual system environment, and can be triggered by some system event recognized by the trace acquisition system. Note that since any buffer used to acquire a trace will have a finite number of entries that will likely be much smaller than the number of clocks consumed in the execution of the program, the trace acquisition system must be able to selectively retain only the information for the clock cycles of interest, i.e., those just before and just after the "trigger" event ("TE"). Further, the system must provide a means for synchronizing the TE with the contents of the trace buffer so that the user can tell exactly what instructions were executing during the clock cycle that the TE occurred. A "non-invasive" trace is one that can be acquired without disturbing the timing behavior of the program from its behavior while not being traced.

A difficulty in acquiring a trace from a highly integrated processor stems from the invisibility of most of the signals required to derive the trace. A typical approach to deriving an instruction trace requires one to determine the location of an instruction being executed on a particular clock cycle (i.e., at the start of the trace), and then to determine for subsequent clock cycles how many instructions are executed, whether they are taken or not if they are branches, and the target addresses for the taken branches.

Because the processor has an integrated instruction cache, the instruction address bus is not accessible externally and hence, each instruction fetch cannot normally be seen. Also, the signals that indicate the number of instructions executed each cycle and the direction taken by conditional branches are not usually available externally to the integrated circuit ("IC"). Therefore, some information must normally be exported from the microprocessor in order to acquire the trace. This information should appear on the external pins of the IC; either on pins that are already used for other purposes such as external data and address buses, or on pins dedicated to the tracing function.

Multiplexing trace data onto existing pins has two potential problems. If the trace runs all the time, it will contend for system resources (e.g., bus bandwidth), degrading performance to support a feature that is only used during software debug operations. If the trace data is switched on only when acquiring a trace, it may affect the timing of the program by delaying the processor's normal access to the shared pins, and thus will be intrusive. Dedicated pins can alleviate this problem; however, to maintain low cost of the IC, the pin count must be kept as low as possible.

A previous invention, disclosed within the cross-referenced patent application, described a set of hardware additions made to a microprocessor to provide a non-intrusive, real-time trace capability with low additional cost to the processor IC. However, that solution had the following deficiencies:

(1) It could only trace forward from a TE. That is, once the TE was recognized, trace information was provided to reconstruct an instruction trace from the clock on which the TE occurred and some finite number of clock cycles (dictated by the depth of the external trace acquisition buffer) after the TE. When debugging, a software engineer may often wish to trigger the capture of the trace when some extraordinary error or event happens, and then to see a trace of the instructions that preceded the unexpected event, to determine what caused the event. For example, one might wish to acquire a trace whenever the processor vectors to an error exception handling routine. In order to determine the cause of the error, one must use the trace of instructions before the error was recognized. The instructions executed after the error occurs are just those of the exception handling routine, and tracing them will be of little use in determining the cause of the error.

(2) It can only indicate a single TE on the output pins. The ability to indicate multiple TEs is useful if the user wants to count TEs and retain the trace information for the time period around the Nth TE.

(3) The partitioning of the solution did not lend itself to reducing cost in a "CORE+ASIC" environment. In this type of design environment, a central processing unit ("CPU") is provided as a large "macro" or "mega-cell" to be used as an element of an Application Specific Integrated Circuit ("ASIC"). The CPU is a "hard macro"; that is, it is a physical design implementation that is placed onto the ASIC as a whole and is not subject to any type of changes or physical optimizations. Since some ASICs may need support for tracing and some may not, it is desirable to add as little hardware to the CPU as possible and allow for another macro block or some part of the ASIC logic to implement the bulk of the additional logic necessary to support trace operations. In this manner, one could easily remove the logic used to support tracing when it is not required on a particular ASIC. The previous solution described within the cross-referenced patent application used three registers in the CPU dedicated to the tracing function; removing them from the CPU is desirable.

(4) The processor operation had to be stopped in order to read the dedicated registers. Stopping the processor operation may be inconvenient or impossible. For example, if it was desired to acquire several trace fragments over the time that the processor runs a relatively long task, the processor could not be stopped to retrieve the information from the dedicated registers without affecting the application that was being traced.

Thus, there is a need in the art for an improved tracing operation for an integrated processor that addresses the above four issues.

SUMMARY OF THE INVENTION

The foregoing needs are addressed by the present invention which provides a system and method for acquiring non-invasive real-time instruction traces from an integrated processor with the following advantages:

(1) The present invention allows for trace acquisition both before as well as after a triggering event ("TE") is recognized by the system.

(2) Multiple TEs can be indicated by the CPU and counted by the external trace gathering system. Former trace acquisition systems started broadcasting trace information when the first TE occurred, and only that one TE was indicated. Multiple TEs are useful, for example, if a user wishes to trace the Nth time through a certain section of code.

(3) Some dedicated hardware is removed from the CPU and replaced with hardware that can be easily partitioned from the CPU, thus making the solution less costly for CORE+ASIC products that do not require the tracing capability.

(4) Stopping of the processor to read the dedicated registers is not required.

The trace pins can be examined and the information on these pins retrieved "on-the-fly". As a result, it is possible to acquire several trace fragments over the time that the processor runs a relatively long task, and the processor operation is not stopped, which alleviates the problem of affecting the application that is being traced.

More specifically, the present invention periodically generates synchronizing events and sends the synchronizing events to an external trace acquisition buffer so that when a triggering event occurs, there will be a predesignated number of stored instructions between the synchronizing events and the triggering event The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

In order to completely reconstruct an instruction trace, the user must be able to determine whether any instructions are executed on each clock cycle being traced, and the address of any such instructions. The system described within this application and the cross-referenced application noted above, operates by dedicating a few pins to the trace function and by broadcasting a data stream on those pins, which allows the external acquisition system to reconstruct the trace.

In an alternative implementation, one might choose to broadcast the address of each instruction executed on every clock along with a validation bit, but this may not be practical because it would require a broadcast of too many bits for each executed instruction. A 32-bit PowerPC microprocessor (available from IBM Corporation) implementation would require 30 address bits and a valid bit using this solution. Processors that have the capability to execute multiple instructions per clock cycle exacerbate the problem; a 2-way superscalar machine would need 62 bits of information broadcast each cycle.

The information content of such a stream of addresses is low, however, since most of the time the processor is just executing instructions in line. For in-line code (i.e., no branches), each address is mostly the same as the one before it, and can be completely determined from the one before it. Accordingly, a coding of the information has been developed that uses the available bandwidth provided by the relatively small number of trace pins significantly more efficiently. The coding is accomplished by broadcasting only the relevant state changes for each processor clock, as opposed to the complete state for each clock cycle.

For the PowerPC architecture, the only state-change information required for most clock cycles is the number of instructions executed, and which, if any, were taken branches. This information is designated as the execution status ("ES") of the processor.

There are a few CPU operations, however, that can change the program flow in a way that cannot be calculated from the execution status information without some additional information. There is also some other information required by the reconstruction process; the sum of all these data requirements is listed below.

First, most of the branch targets in a PowerPC instruction stream can be calculated from the program listing as they are relative to the address of the branch itself; the exceptions are branches to the link register ("LR") or count register ("CTR"). When these instructions are executed, the reconstruction algorithm must determine the value of the LR or CTR to calculate the branch target address. While the hardware could broadcast the value of the LR or CTR each time a branch to LR ("bclr") or a branch to CTR ("bcctr")

is executed, a preferred solution is to have the reconstruction software track the values of the LR and CTR, and the CPU broadcasts only changes to the LR and CTR that could not be determined by inspection of the program listing. These changes are merely the executions of move-to-link-register ("mtlr") and move-to-count-register ("mtctr") instructions; these occur much less frequently than bcctr or bclr opcodes.

Second, if the CPU accepts an interrupt and reloads the instruction address register ("IAR") with an exception handling vector, that information must be broadcast.

Third, some means of signaling the clock cycles on which TEs are recognized by the CPU is needed.

Finally, note that since the data being broadcast from the IC on a clock-by-clock basis is a description of the state changes from one clock cycle to the next, at some point one must require a complete initial state (i.e., the contents of the IAR, LR, and CTR) from which to start a trace reconstruction. Any such clock cycles for which the values of the IAR, LR, and CTR registers are available to the reconstruction software are called "synchronizing events" ("SEs"); these clock cycles provide the starting points for any trace reconstruction.

Figure 1:
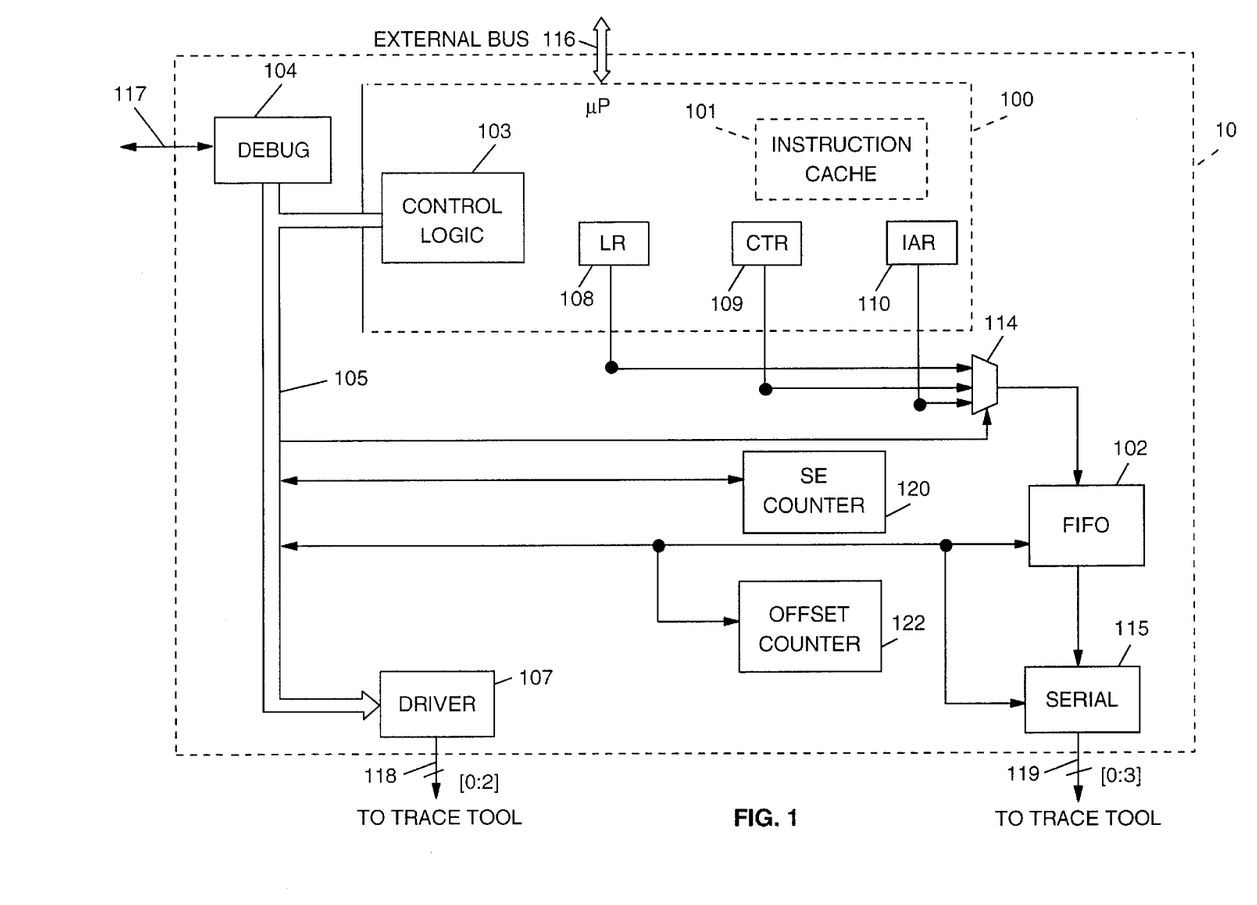
FIG. 1 illustrates a diagram of an embodiment of the present invention for performing tracing of a typical microprocessor.

Referring to FIG. 1, there is illustrated a block diagram of one embodiment of the present invention. Integrated circuit 10 includes logic for performing the tracing of program code running out of an embedded cache (instruction cache 101) within microprocessor 100.

Shadow lines 10 embody elements of the present invention which may be incorporated on a single silicon chip.

Microprocessor 100 may comprise any one of the numerous commercially available microprocessors, e.g., the PowerPC microprocessor, model no. PPC403GA, available from IBM Corporation, the assignee of the present invention. It is to be assumed that microprocessor 100 contains all the usual and well-known microprocessor elements and functionality and performs in the usual manner. Microprocessor 100 includes embedded instruction cache 101; microprocessor 100 can execute code residing in cache 101, or an on-chip memory, without accessing external memory 604 (see FIG. 6) through external bus 116.

Link register ("LR") 108 is an architected register used to provide a branch target address for a "branch conditional to link register" instruction, and to hold the return address after "branch and link" instructions. Count register ("CTR") 109 is an architected register used to hold a loop count that can be decremented during execution of "branch" instructions that update this register. CTR 109 is also utilized to provide the branch target address for a "branch conditional to count register" instruction.

Instruction address register ("IAR") 110 (commonly known as the program counter) is a register that contains the address of the current instruction being executed within microprocessor 100 at any one point in time.

CTR 109 is typically used as a counter for FOR-DO loops or as an alternative to subroutine returns within microprocessor 100. LR 108 is typically used for subroutine CALL/RETURN sequences within microprocessor 100.

Registers 108–110 are architected registers that are typical in microprocessor designs. CTR 109 and LR 108 are software accessible using the instructions MTLR, MFLR, MTCTR and MFCTR, which are well-known in the art. These instructions move values between these registers and general purpose registers within microprocessor 100. LR 108 and CTR 109 are also used by the BCCTR and BCLR branch instructions as branch targets, or as in the case of the BCL, BCLRL, or BCCTRL, LR 108 stores the return address to be used at a later time. Again, such instructions are well-known in the art. IAR 110 is an internal processor resource that is used to keep track of the instruction address that is currently being executed. As a result of the above, registers 108–110 are physically accessible by the present invention in well-known manners.

Mux 114 multiplexes contents from LR 108, CTR 109 and LAR 110 for input into FIFO 102, which is a trace FIFO used to store trace address information for later output to the trace tool.

Mux 114 and FIFO 102 may consist of commercially available multiplexers and FIFOs, which are known to those skilled in the art.

Trace serialization logic ("Serial Circuit") 115 serializes the trace FIFO data received from FIFO 102 for serial broadcast over a 4-bit bus 119 to the trace tool.

Debug logic circuit 104 provides an interface in-between circuit 10 and a user for allowing various trace events to be enabled. Trace events may also be enabled via software executed within the data processing system employing circuit 10 via bus 116.

The creation of an SE requires two mechanisms. One to determine which clock cycles to designate as SEs, and one to provide the value of the IAR 110, LR 108, and CTR 109 registers at the point of the SE to the reconstruction software.

The invention disclosed within the cross-referenced patent application created a single SE by using the TE to determine on which clock cycle the SE occurs; they were defined to be the same. When the first TE was recognized, the values of the IAR 110, LR 108, and CTR 109 registers were stored in registers in the CPU dedicated to this purpose. The CPU then signaled the occurrence of the TE so the external trace acquisition software could be directed to save the broadcast of trace information for the TE and the clock cycles that immediately follow it. At some later time after the code being traced had executed, the reconstruction software could get the values of the IAR 110, LR 108, and CTR 109 from the SE from the dedicated registers on the CPU.

This solution had three problems as noted above. The present invention separates the generation and broadcast of SEs from the recognition and broadcast of the TEs. It does so by using an SE counter 120 to generate an SE periodically, for example every N clock cycles. This technique can be used to provide the ability to trace the execution of an arbitrary number of instructions before a TE. Any number of TEs can be signaled and counted by the external trace acquisition logic before beginning to retain the broadcast data from which a trace will be constructed using the present invention. Reconstruction is no longer required to begin on the first (or any) of the TEs; it begins with an arbitrarily chosen SE instead.

Further, the present invention does not use dedicated registers to store the values of the IAR 110, LR 108, and CTR 109 registers for the SEs, but broadcasts them via the same method used to broadcast other information such as execution of mtlr or mtctr and vectoring to exception routines.

The exact information required to be broadcast depends on the architecture of the processor being traced. The present implementation example uses seven I/O pins to broadcast enough information to reconstruct a trace.

Three of the seven pins encode the execution status ("ES") of a two-way superscalar CPU. These ES pins are pins 118 in FIG. 1. One could use only two pins for a single-issue machine, or even more pins for a machine with a more complicated execution model. There is no particular preference as to which symbol represents what CPU state information; any assignment that covers all the required states is acceptable. The ES information may be binary-encoded for each cycle as follows:

000 - no instructions were executed on this clock cycle;
001 - an interrupt occurred, transferring execution to an exception vector address;
010 - only first instruction available executed and it was not a taken branch;
010 - only first instruction available executed and it was a taken branch;
100 - two instructions executed; neither was a taken branch;
101 - two instructions executed; the first was a taken branch;
110 - two instructions executed; the second was a taken branch;
111 - two instructions executed; both were taken branches.

Figure 4:
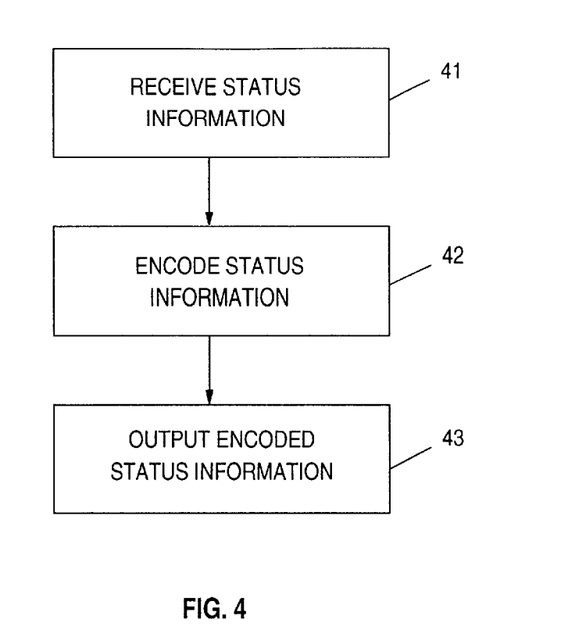
FIG. 4 illustrates a flow diagram of the transmission of status information.

Referring to FIG. 4, there is illustrated a flow diagram of how ES information is broadcast from IC 10. In step 41, status information is received from microprocessor 100 by control logic 103. Such status information may include the execution of an instruction, the direction of any executed branches, and the taking of any exception vectors. Next, in step 42, control logic 103 encodes the received status information using the encoding noted above. Then, in step 43, this encoded execution status information is output along bus 105 through driver 107 onto pins 118 to the trace tool (see FIG. 9). This information is continuously provided on pins 118.

This ES information is sufficient to determine what instructions are executed and which ones are taken branches on each cycle. It is not enough to completely trace instructions within microprocessor 100. As noted above, the trace reconstruction software process has access to the object code that is being executed, so it can use the information provided on the ES pins 118 to follow in-line instructions and taken branches whose targets are specified by the instructions themselves. However, the trace reconstruction software must also be able to determine the value of the LR 108 or CTR 109 registers during any clock cycle in which a branch to one of those targets occurs, changes in program flow due to exceptions, when trigger events occur, and what the initial state of registers 108–110 are for the initial cycle of trace reconstruction (i.e., a specific SE occurrence).

Pins 119 are referred to as the trace status ("TS") pins, and are used to broadcast information that is required in addition to the cycle-by-cycle status provided by ES pins 118. Note that execution of mtlr, mtctr, and interrupt responses occur relatively infrequently, but they require the processing of a 30-bit instruction address. Therefore, each of these pieces of data are broadcast serially on three of TS pins 119, 3-bits at a time over the course of 10 cycles. (The fourth pin of pins 119 is a "1" when broadcasting address information; see the coding table below.) The reconstruction process can determine the cause of the broadcast by analysis of the program listing that will show mtlr and mtctr instructions, and the execution status, which will indicate a vector to an interrupt handler. The choice of the number of TS pins 119 is a compromise between the amount of bandwidth required and the cost of adding dedicated pins to IC 10; this implementation has four TS pins 119, but a design could be proposed with a few more or less that would not be conceptually different.

Referring back to FIG. 1, multi-word first-in-first-out ("FIFO") buffer 102 allows several broadcasts to be queued in the case of a "burst" of mtlr/mtctr instructions, i.e., the case of executing such an instruction before the previous broadcast is completed. If FIFO 102 is completely fill when CPU 100 needs to make an entry to be broadcast, CPU 100 must halt execution (stall) until the oldest entry in FIFO 102 has been broadcast and removed from FIFO 102. Correct operation of the stall program and the ability to trace that program are assured in this case, but the user will see a performance degradation. Thus, while the depth of FIFO 102 is arbitrary with regard to correct logical function, too few locations will degrade performance, and too many locations will waste space on IC 10. For purposes of providing an example, but not meant to limit the implementation of the present invention, statistical analysis of typical PowerPC code has shown that the choice of 8 locations within FIFO 102 renders insignificant the probability of stalling CPU 100 due to a full trace FIFO 102.

Figure 2:
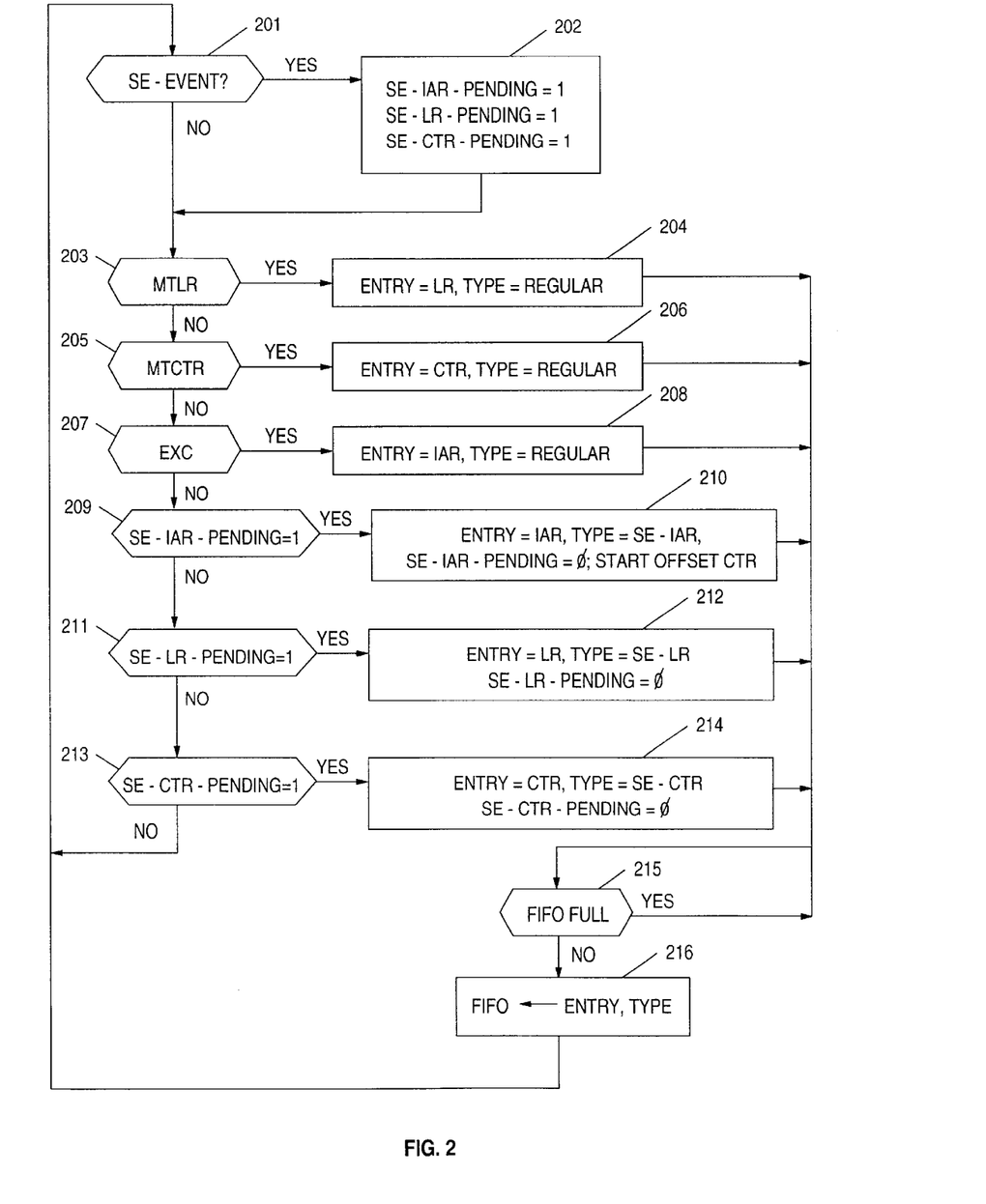
FIG. 2 illustrates a flow diagram of a loading of the FIFO utilized within one embodiment of the present invention.

As noted within FIG. 2, if an mtlr instruction is being executed in CPU 100, then at step 203, the process moves to step 204 whereby the value placed in LR 108 by the execution of the mtlr instruction is also placed into the ENTRY for loading into FIFO 102.

FIG. 2 illustrates that both a value (ENTRY) and a type (TYPE) are entered into FIFO 102 as a pair, and when they leave FIFO 102, the TYPE is used to notify serialization logic 115 of which codes or counter values (if any) to prefix to the broadcast of the ENTRY onto TS pins 119.

In step 201, there is a determination of whether or not an SE event has occurred. If not, the process merely proceeds to step 203. However, if an SE event has occurred, then in step 202, parameters SE-IAR-PENDING, SE-LR-PENDING, and SE-CTR-PENDING are made equal to 1. An SE event may be determined when SE counter 120 reaches a predetermined value.

Next, in step 203, if an mtlr instruction has been executed in CPU 100, then as described above, the process moves to step 204 to place the value of LR 108 into the ENTRY, and to designate the TYPE as REGULAR. The same is true for steps 205 and 207 with respect to the MTCTR and exception causing instructions being executed in CPU 100. If an MTCTR instruction has been executed and completed, then this value is placed in the ENTRY and the TYPE is designated as REGULAR in step 206. Likewise, in step 208, if an exception causing instruction has been executed, then the IAR value is placed in the ENTRY and the TYPE is designated as REGULAR.

If none of these instructions in steps 203, 205, and 207 have been executed in CPU 100, then the process proceeds to step 209 to determine whether or not SE-IAR-PENDING equals 1, indicating that an SE event has occurred (see step 201). If yes, the process proceeds to step 210 to place the value in IAR 110 into the ENTRY and to designate its TYPE as SE-IAR. Additionally, the value SE-IAR-PENDING is returned to a 0 value. Furthermore, offset counter 122 is started.

The process will then proceed to step 215 to determine whether or not FIFO 102 is full, if so, step 215 will be recycled until FIFO 102 is not full when the process will proceed to step 216 to enter the ENTRY and TYPE into FIFO 102.

The process then returns to step 201, and will proceed down to step 211 if no SE event has occurred and MTLR, MTCTR, and exception causing instructions have not been completed. In step 211, since the SE-LR-PENDING value is still equal to 1, the process will proceed to step 212 to enter the value of LR 108 into the ENTRY of FIFO 102 along with the TYPE designated as equal to SE-LR. The value SE-LR-PENDING will be returned to 0.

The foregoing process will also occur with respect to steps 213 and 214 for entering the value of CTR 109 into FIFO 102.

Figure 7:
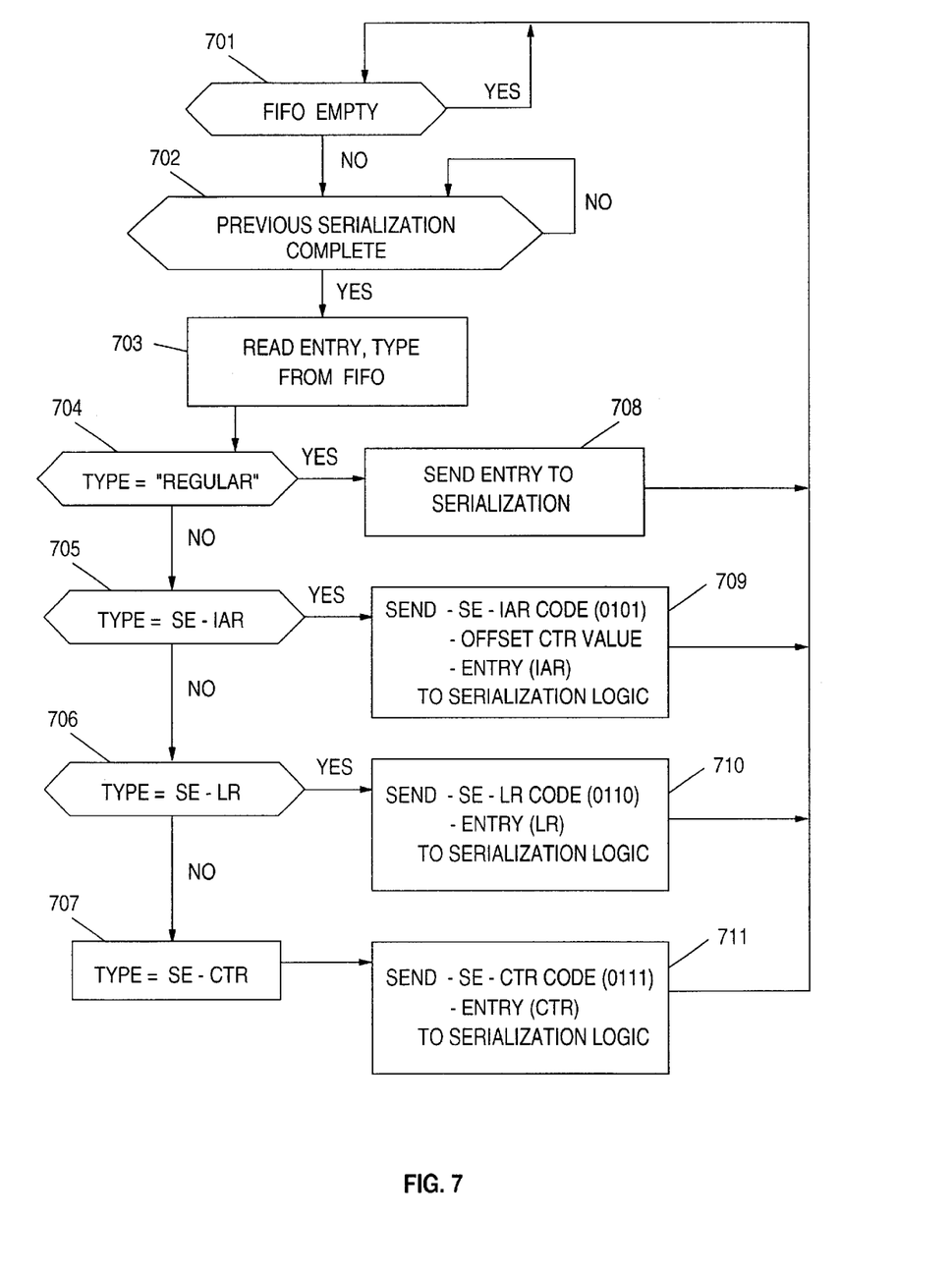
FIG. 7 illustrates a flow diagram of the transmission of data to the FIFO as a result of synchronizing events or execution of mtlr, mtctr, or exception vectoring.

The flow diagrams illustrated in FIGS. 2 and 7 may be utilized by one skilled in the art to design FIFO 102.

Microprocessor 100 includes hardware to recognize certain TEs including, but not limited to, the execution of certain instructions or access of data at predefined addresses stored in dedicated registers on microprocessor 100.

Figure 5:
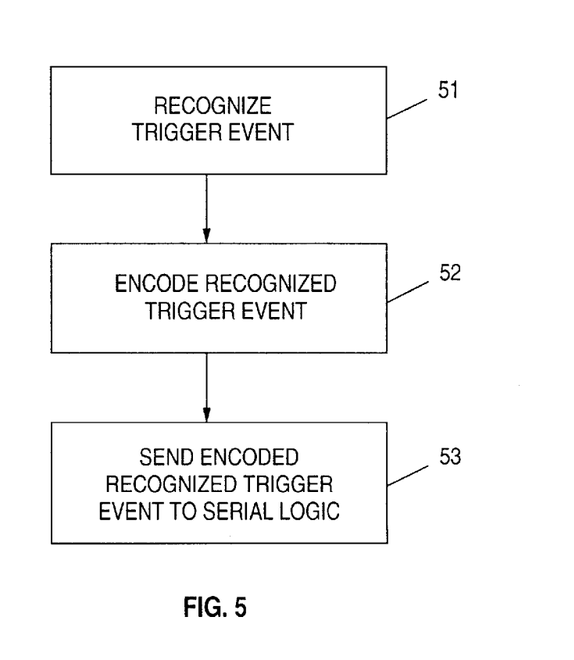
FIG. 5 illustrates a flow diagram of the encoding of a trigger event.

Essentially, a user sets up a trace by directing the circuitry within chip 10 to broadcast a TE when certain conditions occur. This is performed by control logic 103 monitoring such addresses and control within microprocessor 100 and performing a comparison with an event designated by the user through debug circuit 104. Referring to FIG. 5, this process begins with step 51 where a TE is recognized. Then, in step 52, the recognized TE is encoded as shown in the table below (e.g., 0100). In step 53, this encoded recognized TE is sent to serial logic 115 for broadcast on pins 119. Generally, the external acquisition system will recognize the symbol for the TE (0100) and cause the external trace buffer (see FIG. 8) to save data in the temporal vicinity of the TE. For example, if one uses a logic analyzer 91 (see FIG. 9) with a buffer depth of 2000 clocks to capture the trace data, one might program analyzer 91 to save the data from the clocks from 1000 clocks before the TE until 1000 clocks after the TE. The broadcast of the TE is a little different than the broadcast of all the other information on TS pins 119 in that it does not enter FIFO 102. Instead, the code (0100) for the TE is placed on TS pins 119 in the clock cycle immediately after the clock cycle in which the TE is recognized. And, if data is in the process of being broadcast from FIFO 102, that broadcast is deferred for the one clock cycle occupied by the broadcast of the TE code. This policy allows the TE to be related directly to the data on ES pins 118 so that the reconstruction software can discern what instruction was executing when the TE was signalled.

Figure 3:
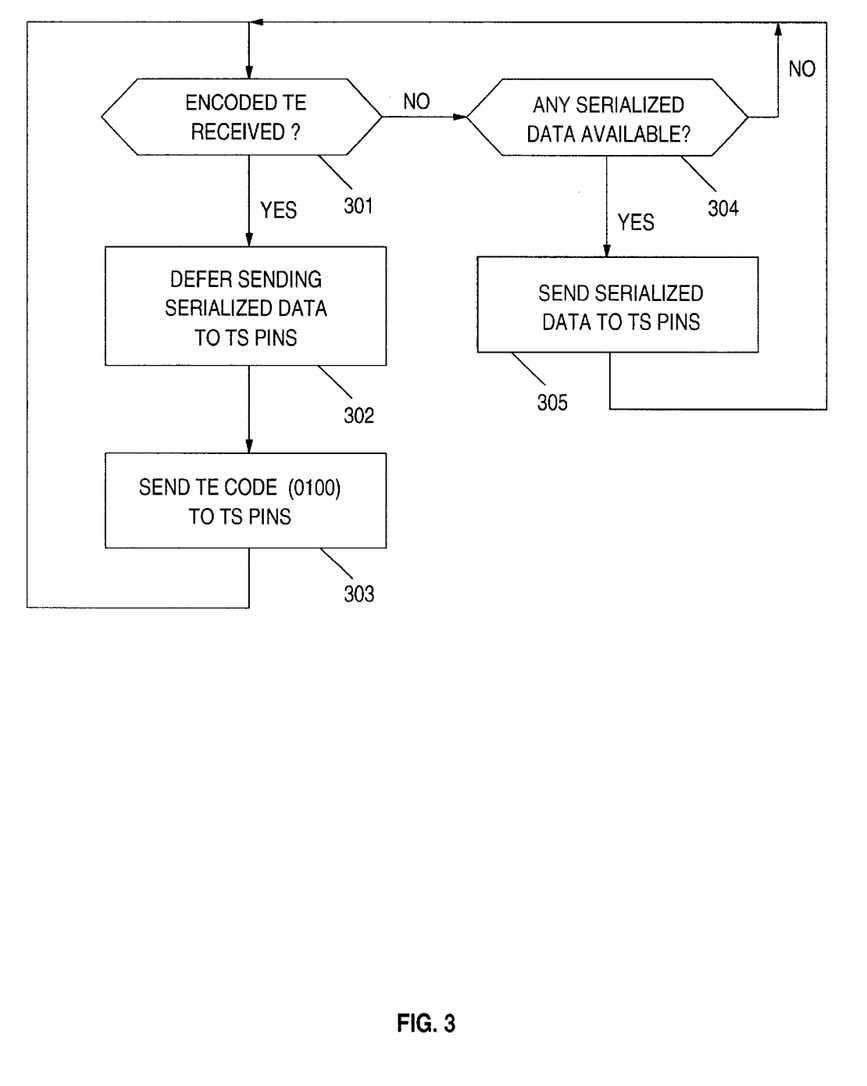
FIG. 3 illustrates a flow diagram of sending TE and serialized FIFO output information to the TS pins.

Referring next to FIG. 3, there is illustrated a flow diagram of this process implemented within serial logic 115. The process proceeds to step 301 to determine whether or not an, encoded TE has been received from control logic 103. If not, the process forwards to step 304. However, if an encoded TE has been received, then the process proceeds to step 302 wherein sending of serialized data to TS pins 119 is deferred. Then in step 303, the encoded TE signal (0100) is sent on pins 119.

In step 304, a determination is made whether or not there is any serialized data available to send onto TS pins 119. If not, the process returns to step 301. However, if there is serialized data available, the process proceeds to step 305 to send this serialized data to TS pins 119. The process then returns to step 301.

SE information is also broadcast on TS pins 119 using FIFO 102 in the same manner as information regarding mtlr, mtctr, and exception vectors are. In one embodiment, SEs are generated periodically by control logic 103 in response to a continuously running counter 120, which may be clocked by the same clock as CPU 100. Alternatively, the SEs could be generated by some other means such as an external input.

Whenever the value of SE counter 120 matches a predetermined value (e.g., 0), an SE is generated. The "generation" of an SE is defined as setting the SE-IAR-PENDING, etc. flags.

All broadcasts of SE addresses are preceded by codes on TS pins 119 that identify the types of the broadcast. The specific encoding of pins 119, including encoding of TEs and other events, may be as follows:

0000 - no broadcast
0001 - reserved
0010 - processor is in wait state
0011 - processor is in stop state
0100 - trigger event (TE)
0101 - SE IAR code - proceeds counter value plus SE-LAR broadcast
0110 - SE LR code - proceeds SE-LR broadcast
0111 - SE CTR code - proceeds SE-CTR broadcast
1xxx - address broadcast (for SEs, mtlr, mtctr, exception vectors)
(xxx) - are three bits of a 10-cycle serial broadcast of an address Note: "stop" and "wait" states are debugging and power-down states of CPU 100. Users may wish to know that CPU 100 is in one of these states, so this implementation provides this information on TS pins 119. CPU 100 does not execute instructions in these states, and so for purposes of this invention, these encodings may be irrelevant.

When the IAR 110 value for the SE is placed into FIFO 102, offset counter 122 begins counting up from 0. When the LAR 110 value for the SE is to be broadcast from FIFO 102, the value of offset counter 122 is broadcast after the IAR SE code and before the LAR address data. Since the value of the offset counter 122 is the number of cycles since the SE was placed into FIFO 102, the reconstruction software can relate the cycle on which the IAR broadcast appears on TS pins 119 to the cycle in which the SE entered FIFO 102. Hence, it can determine the IAR 110 value associated with a specific cycle of data from ES pins 118, and begin trace reconstruction from that cycle.

Referring next to FIG. 7, there is illustrated a flow diagram of this process, which may be implemented within control logic 103. In step 701, a determination is made whether or not FIFO 102 is empty. If yes, the process simply returns upon itself. However, if FIFO 701 is not empty, then in step 702, a determination is made whether or not the previous serialization has been completed. If not, the process recycles upon itself However, if the previous serialization is complete, the process proceeds to step 703. In step 703, the ENTRY and TYPE are read from FIFO 102 into serialization logic 115 (see FIG. 3). Then in step 704, if the TYPE is REGULAR (see FIG. 2), the process proceeds to step 708 to send the ENTRY for serialization and tranansmission along TS pins 119. The process then returns to step 701.

However, if in step 704 the TYPE is not REGULAR, the process proceeds to step 705 to determine whether or not the TYPE is equal to SE-IAR (see step 210). If yes, the process proceeds to step 709 to send the SE-LAR code (0101), the offset counter value (see step 210 in FIG. 2), and the IAR ENTRY to serialization logic 115 (see FIG. 3).

If in step 705, the TYPE is not equal to SE-IAR, the process proceeds to step 706 to determine whether or not the TYPE is equal to SE-LR. If yes, then in step 710, the SE-LR code (0110) and the LR ENTRY are sent to serialization logic 115 (see FIG. 3).

If in step 706, the TYPE is not equal to SE-LR (see step 212 of FIG. 2), then the process proceeds to step 707 where the TYPE is equal to SE-CTR (see step 214 in FIG. 2). The process proceeds to step 711 to send the SE-CTR code (0111) and the CTR ENTRY to serialization logic 115 (see FIG. 3).

The following analyzes the relationship of an SE, the external trace acquisition buffer depth and the mininum number of cycles before the desired TE for which a trace can be reconstruction.

As noted above, it is desirable to begin trace reconstruction on some cycle before the TE. Trace reconstruction can begin with any cycle held in the trace acquisition buffer 91 for which one can determine the initial state of the machine, i.e., the contents of IAR 110, LR 108, and CTR 109. These cycles are those previously designated as synchronizing events ("SEs"). The solution described within the cross-referenced patent application had only one SE, which was the same as the first TE. The present invention has multiple SEs, generated and broadcast periodically.

The problem, then, is to guarantee the generation of an SE cycle some number of cycles before an event of interest, that is, the trigger event. Then one can trace from the SE to the TE, effectively tracing the CPU operation before the TE.

Figure 8:
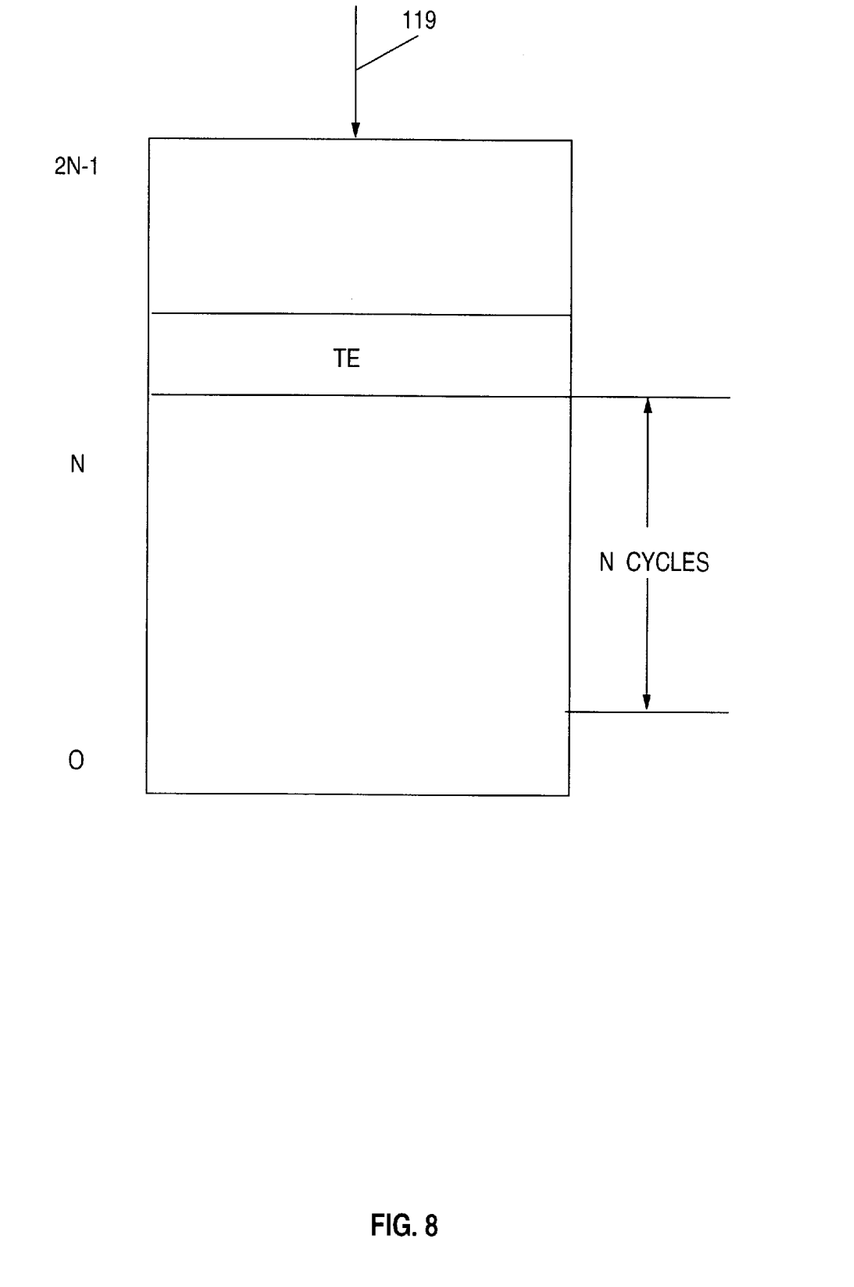
FIG. 8 illustrates a trace acquisition buffer.
Figure 9:
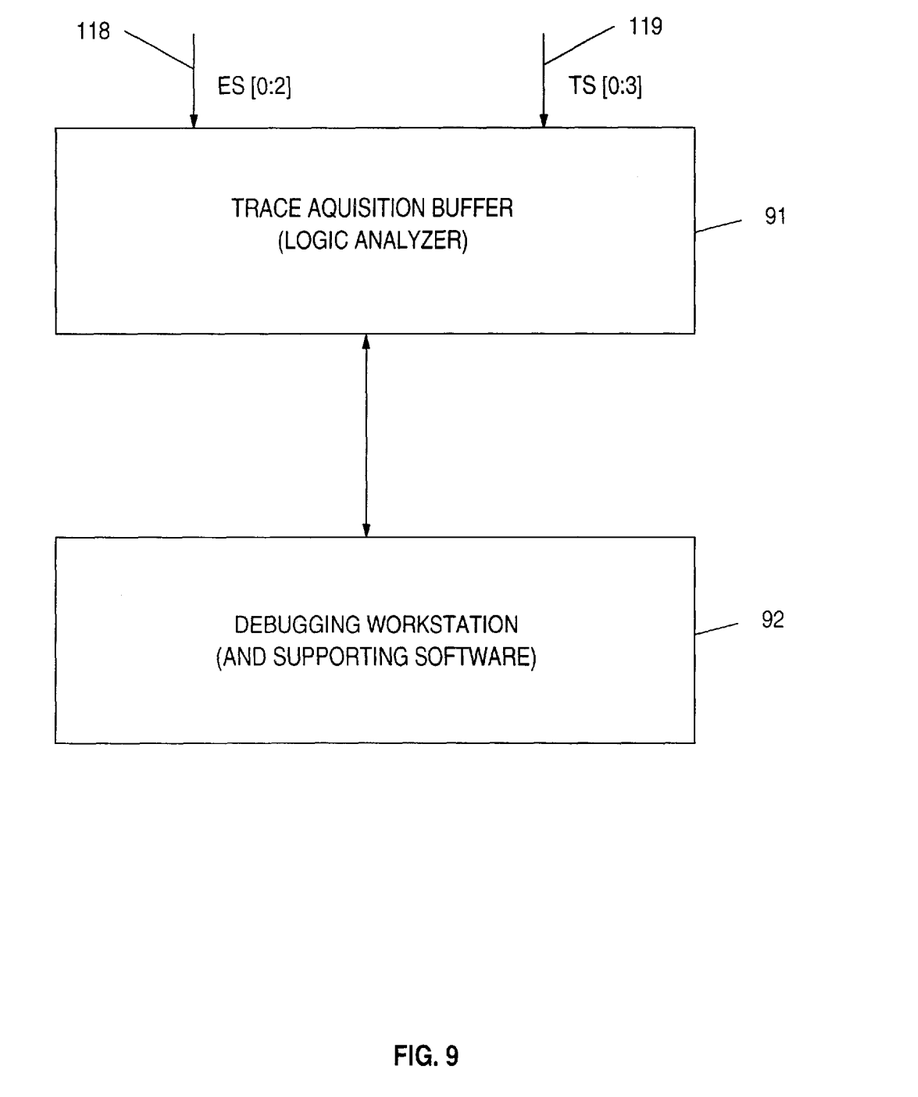
FIG. 9 illustrates a trace acquisition buffer and a debugging workstation.

Referring next to FIG. 8, there is shown one example of trace acquisition buffer 91 shown in FIG. 9. In order to guarantee that there is even an SE in trace buffer 91 at all, the periodicity of the SEs should be less than or equal to the depth of trace buffer 91. For example, if trace buffer 91 has some number of entries N, and the SEs occur every N cycles, a simple implementation might be to capture blocks of N clocks beginning with each SE cycle, and retaining the block for reconstruction if the desired TE is detected within the saved block. This solution may not guarantee any arbitrary number of clocks to be traced before the occurrence of the TE, since the TE may be at or near the beginning of the period between start cycles.

One alternative solution is to cause a periodic SE frequently enough to insure that multiple SEs will be evenly distributed in trace acquisition buffer 91. Note that a trace can be reconstructed beginning from any of them. As an example, suppose that an SE is generated every N cycles, and the depth of trace acquisition buffer 91 is 2N. If the buffer 91 locations are designated from 0 to 2N-1, and it is assumed that the trace entries are kept in temporal order from 0 to 2N-1 as well, and the data at location 2N-1 is that which is collected in the last cycle, and the data in location 0 is that which is collected 2N cycles previous, then after a TE is recognized, trace buffer 91 stops acquiring new data when the older SE reaches location 0. Then there will be 2 SEs in buffer 91, one at location 0 (the oldest instruction) and one at location N, or about halfway through buffer 91. TE is captured somewhere in the second half of buffer 91, and since one can trace from the older SE to the end of buffer 91, the ability to trace at least N cycles before the TE is guaranteed.

More generally, if an SE is caused every N cycles, and there is a trace buffer depth of mN, then the ability to trace up to $(m^{-1})N$ cycles before the TE may be guaranteed.

Referring next to FIG. 9, there is illustrated an example of a trace tool coupled to pins 118 and 119. Trace acquisition buffer 91 is coupled to debugging workstation and supporting software 92. Any well-known trace tool may be used to capture the appropriate trace information in the manner set forth herein, and a reconstruction algorithm can be used to reconstruct the code flow from the captured trace information. A typical trace tool might interface to debug logic 104 via an IEEE Std. 1149.1–1990 Std. Interface (JTAG 117), and would monitor trace pins 118 and 119.

Figure 6:
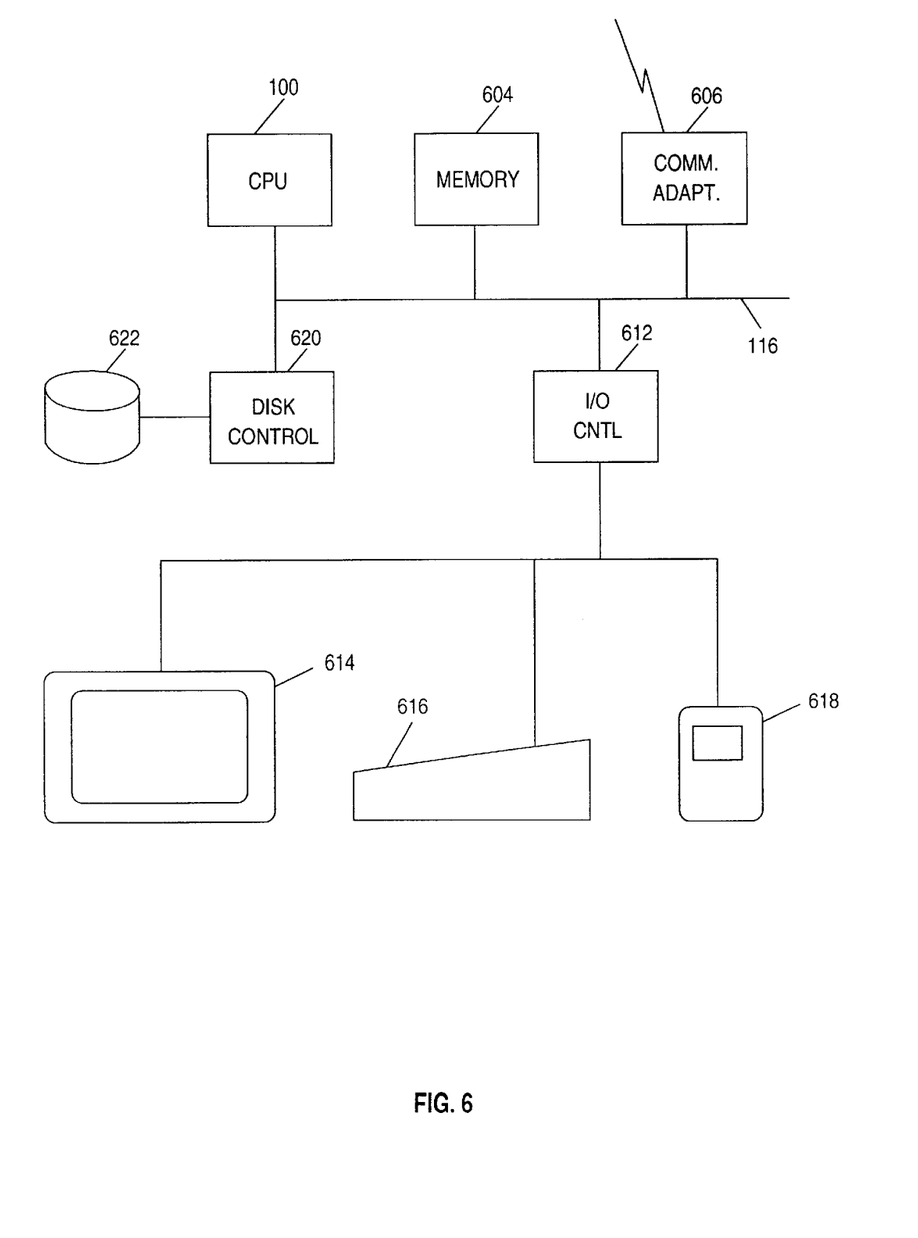
FIG. 6 illustrates a data processing system employing an embodiment of the present invention or of a debugging workstation.

Referring next to FIG. 6, there is illustrated a data processing system operable for implementing the present invention. Processor 100 is coupled via bus 116 to random access memory 604, permanent storage 622, optional communications adapter 606, which enables communication with other systems, input/output controller 612, which controls interaction with video display 164, keyboard 616, pointing device 618, disk controller 620, which controls interaction between processor 100 and permanent storage 622. The devices disclosed are typically available components. A removable diskette or an optical drive could be used in place of a magnetic drive for permanent storage 622 and processor 100 could be comprised of a number of processing engines in a multiprocessor or parallel processing architecture.

Although the present invention and its advantages have been described in detail, it should be understood that various changes, substitutions and alterations can be made herein without departing from the spirit and scope of the invention as defined by the appended claims.

What is claimed is:

1. A circuit for tracing program execution within a processor, said circuit comprising:
    circuitry for acquiring instructions occurring before and after a triggering event; and
    circuitry for providing said acquired instructions externally from said processor.

2. The circuit as recited in claim 1, further comprising:
    circuitry for detecting said triggering event, wherein said triggering event is a predetermined action occurring in said processor.

3. The circuit as recited in claim 2, wherein said triggering event is an Nth time said predetermined action has occurred in said processor, wherein N is a positive integer greater than one.

4. The circuit as recited in claim 2, wherein said acquired instructions have been completed in real-time by said processor.

5. The circuit as recited in claim 1, wherein said acquiring circuitry is coupled to one or more registers within said processor.

6. The circuit as recited in claim 5, wherein said one or more registers includes a link register, a count register, and an instruction address register.

7. The circuit as recited in claim 6, wherein said acquiring circuitry further comprises:
    a FIFO, coupled to said link register, count register, and instruction address register, for temporarily storing information received from said link register, count register, and instruction address register, and serialization circuitry, coupled to said FIFO, for serialization of said information.

8. The circuit as recited in claim 1, further comprising:
    circuitry for acquiring one or more synchronizing events occurring before said triggering event, wherein said one or more synchronizing events signify a state of said processor at a predetermined number of clock cycles before said triggering event.

9. The circuit as recited in claim 1, wherein the triggering event is a predetermined action occurring in the processor.

10. The circuit as recited in claim 9, wherein the triggering event occurs when an event occurs within the processor that matches an event predesignated by a user of the processor.

11. The circuit as recited in claim 8, wherein said traced instructions provided externally from said processor occur after said one or more synchronizing events and before said triggering event.

12. The circuit as recited in claim 1, wherein said triggering event is encoded before being provided externally from said processor.

13. An integrated circuit for tracing program execution within a processor embedded in said integrated circuit, said integrated circuit comprising:
    circuitry for acquiring completed instructions occurring before and after a triggering event detected within said processor, wherein said triggering event is a predetermined action occurring in said processor, and
    circuitry for providing said acquired completed instructions externally from said processor.

14. The integrated circuit as recited in claim 13, wherein said acquiring circuitry further comprises:
    a FIFO, coupled to a link register, count register, and instruction address register in said processor, for temporarily storing instructions received from said link register, count register, and instruction address register; and
    serialization circuitry, coupled to said FIFO, for serialization of said instructions.

15. The integrated circuit as recited in claim 14, further comprising:
    a counter; and
    circuitry for acquiring one or more synchronizing events occurring before said triggering event, wherein said one or more synchronizing events signify a state of said processor a number of clock cycles before said triggering event, wherein said number of clock cycles is determined by said counter.

16. The integrated circuit as recited in claim 15, wherein said one or more synchronizing events are temporarily stored in said FIFO and then serialized for output from said integrated circuit by said serialization circuitry.

17. The integrated circuit as recited in claim 13, further comprising circuitry for outputting from said integrated circuit instruction execution status information from said processor.

18. The integrated circuit as recited in claim 14, further comprising circuitry for delaying output of instructions from said FIFO while information regarding said triggering event is output from said integrated circuit.

19. The integrated circuit as recited in claim 13, wherein said triggering event is an Nth time said predetermined action has occurred in said processor, wherein N is a positive integer greater than one.

* * * * *